(12) United States Patent
Zihayat Kermani et al.

(10) Patent No.: US 11,687,608 B2
(45) Date of Patent: Jun. 27, 2023

(54) TEAM DISCOVERY FOR COMMUNITY-BASED QUESTION ANSWERING SYSTEMS

(71) Applicant: International Business Machines Corporation, Armonk, NY (US)

(72) Inventors: Morteza Zihayat Kermani, North York (CA); Roohollah Etemadi, North York (CA); Ebrahim Bagheri, Toronto (CA); Kuan Feng, Ontario (CA); Jason Walter Adelman, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 17/390,896

(22) Filed: Jul. 31, 2021

(65) Prior Publication Data
US 2023/0030624 A1 Feb. 2, 2023

(51) Int. Cl.
*G06F 16/9536* (2019.01)
*G06F 40/30* (2020.01)

(52) U.S. Cl.
CPC .......... *G06F 16/9536* (2019.01); *G06F 40/30* (2020.01)

(58) Field of Classification Search
None
See application file for complete search history.

(56) References Cited

U.S. PATENT DOCUMENTS

2020/0342462 A1\* 10/2020 Todd .................... G06F 40/211
2022/0164538 A1\* 5/2022 Bornea ................. G06F 40/58

FOREIGN PATENT DOCUMENTS

CN 103488637 B 12/2016
KR 101563236 B1 10/2015

OTHER PUBLICATIONS

Yang et al., "CQARank: Jointly Model Topics and Expertise in Community Question Answering," CIKM'13: Proceedings of the 22nd ACM International Conference on Information and Knowledge Management Oct. 27-Nov. 1, 2013, San Francisco, CA. 99-108, Research Collection School of Information Systems.

Yang et al., "Expert recommendation in community question answering: a review and future direction," International Journal of Crowd Science, vol. 3, No. 3, Emerald Publishing Limited, Mar. 2019, pp. 348-372.

Mumtaz et al., "Expert2Vec: Experts Representation in Community Question Answering for Question Routing," International Conference on Advanced Information Systems Engineering, Rome, Italy, May 29, 2019, 15 pages.

(Continued)

*Primary Examiner* — Giuseppi Giuliani
(74) *Attorney, Agent, or Firm* — VanLeeuwen & VanLeeuwen; Kimberly Zillig

(57) ABSTRACT

An approach is provided in which the approach maps a set of question nodes and a set of expert nodes to an embedding space. The set of question nodes corresponds to a set of questions and the set of expert nodes corresponds to a set of experts in a CQA network. The approach maps a new question to the embedding space based on analyzing the new question against the set of questions, and selects a subset of the set of expert nodes based on their location in the embedding space relative to the mapping of the new question. The approach transmits the question to a subset of the set of experts that correspond to the subset of expert nodes.

17 Claims, 8 Drawing Sheets

(56) References Cited

OTHER PUBLICATIONS

Chang et al., "Routing Questions for Collaborative Answering in Community Question Answering," 2013 IEEE/ACM International Conference on Advances in Social Networks Analysis and Mining, ASONAM'13, Aug. 25-29, 2013, Niagara, Ontario, Canada, pp. 494-501.

Awal et al., "Team formation in social networks based on collective intelligence—an evolutionary approach," Applied Intelligence, Jun. 2014, vol. 41, pp. 627-648.

Lappas et al., "Finding a Team of Experts in Social Networks," The 15th ACM SIGKDD International Conference on Knowledge Discovery and Data Mining, KDD 2009, Jun. 2009, Paris, France, 9 pages.

Selvarajah et al., "Identifying a Team of Experts in Social Networks using a Cultural Algorithm," Procedia Computer Science, vol. 151, 2019, pp. 477-484.

Dai et al., "Convolutional neural networks for soft-matching n-grams in ad-hoc search," Proceedings of the eleventh ACM international conference on web search and data mining, pp. 126-134, Feb. 2018, Marina Del Rey, CA.

Fang et al., "Community-based question answering via heterogeneous social network learning," Proceedings of the Thirtieth AAAI Conference on Artificial Intelligence, Feb. 2016, Phoenix, AZ, pp. 122-128.

Kargar et al., "Efficient bi-objective team formation in social networks," Joint European Conference on Machine Learning and Knowledge Discovery in Databases, pp. 483-498, Springer, Sep. 2012, Bristol, UK.

Kargar et al., "Finding affordable and collaborative teams from a network of experts," Proceedings of the 2013 SIAM International Conference on Data Mining, pp. 587-595, SIAM, 2013, Austin, TX.

Li et al., "Personalized question routing via heterogeneous network embedding," Proceedings of the 33rd AAAI Conference on Artificial Intelligence, vol. 33, pp. 192-199, Jan. 2019, Honolulu, HL.

Datta et al., "Capacitated team formation problem on social networks," Proceedings of the 18th ACM SIGKDD international conference on Knowledge discovery and data mining, pp. 1005-1013, Aug. 2012, Beijing, China.

Rahman et al., Optimized group formation for solving collaborative tasks. The VLDB Journal, 28(1):1-23, 2019.

Rangapuram et al., "Towards realistic team formation in social networks based on densest subgraphs," Proceedings of the 22nd international conference on World Wide Web, pp. 1077-1087, May 2013, Rio de Janeiro, Brazil.

Xiong et al., "End-to-end neural ad-hoc ranking with kernel pooling," Proceedings of the 40th International ACM SIGIR conference on research and development in information retrieval, pp. 55-64, Aug. 2017, Tokyo, Japan.

Yuan et al., "Expert finding in community question answering: a review," Artificial Intelligence Review, 53(2):843-874, 2020.

Zhao et al., "Community-based question answering via asymmetric multi-faceted ranking network learning," Thirty-First AAAI Conference on Artificial Intelligence, Feb. 2017, San Francisco, CA, pp. 3532-3538.

* cited by examiner

TEAM DISCOVERY FOR COMMUNITY-BASED QUESTION ANSWERING SYSTEMS

BACKGROUND

Community-based question answering (CQA) systems are popular web-based services that connect information seekers with experts' knowledge. CQA systems are dedicated platforms for users to respond to other users' questions, resulting in the building of a community where users share and interactively provide ratings to questions and answers. CQA services are emerging as a valuable information resource that is rich in the expertise of the user community, their interactions, and their insights.

CQA systems provide an Internet-based crowdsourcing service that enables users to post their questions on a CQA website. Typically, the answers in the CQA websites are highly specific for personal questions and enable users to directly request answers from complex and heterogeneous information. Expert finding techniques for CQA systems primarily focus on retrieving a ranked list of experts that are relevant to a user's specific question.

BRIEF SUMMARY

According to one embodiment of the present disclosure, an approach is provided in which the approach maps a set of question nodes and a set of expert nodes to an embedding space. The set of question nodes corresponds to a set of questions and the set of expert nodes corresponds to a set of experts in a CQA network. The approach maps a new question to the embedding space based on analyzing the new question against the set of questions, and selects a subset of the set of expert nodes based on their location in the embedding space relative to the mapping of the new question. The approach transmits the question to a subset of the set of experts that correspond to the subset of expert nodes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
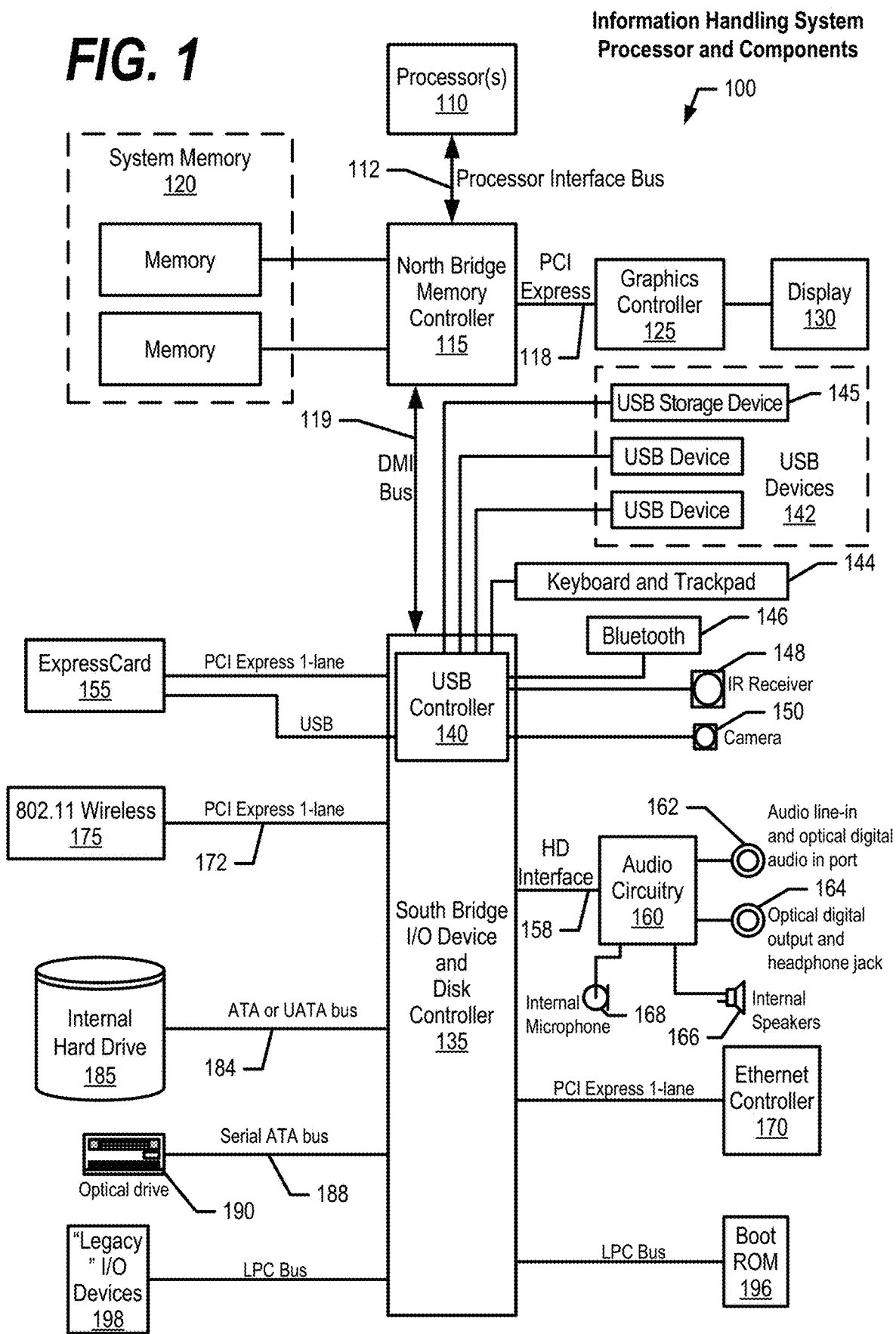
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
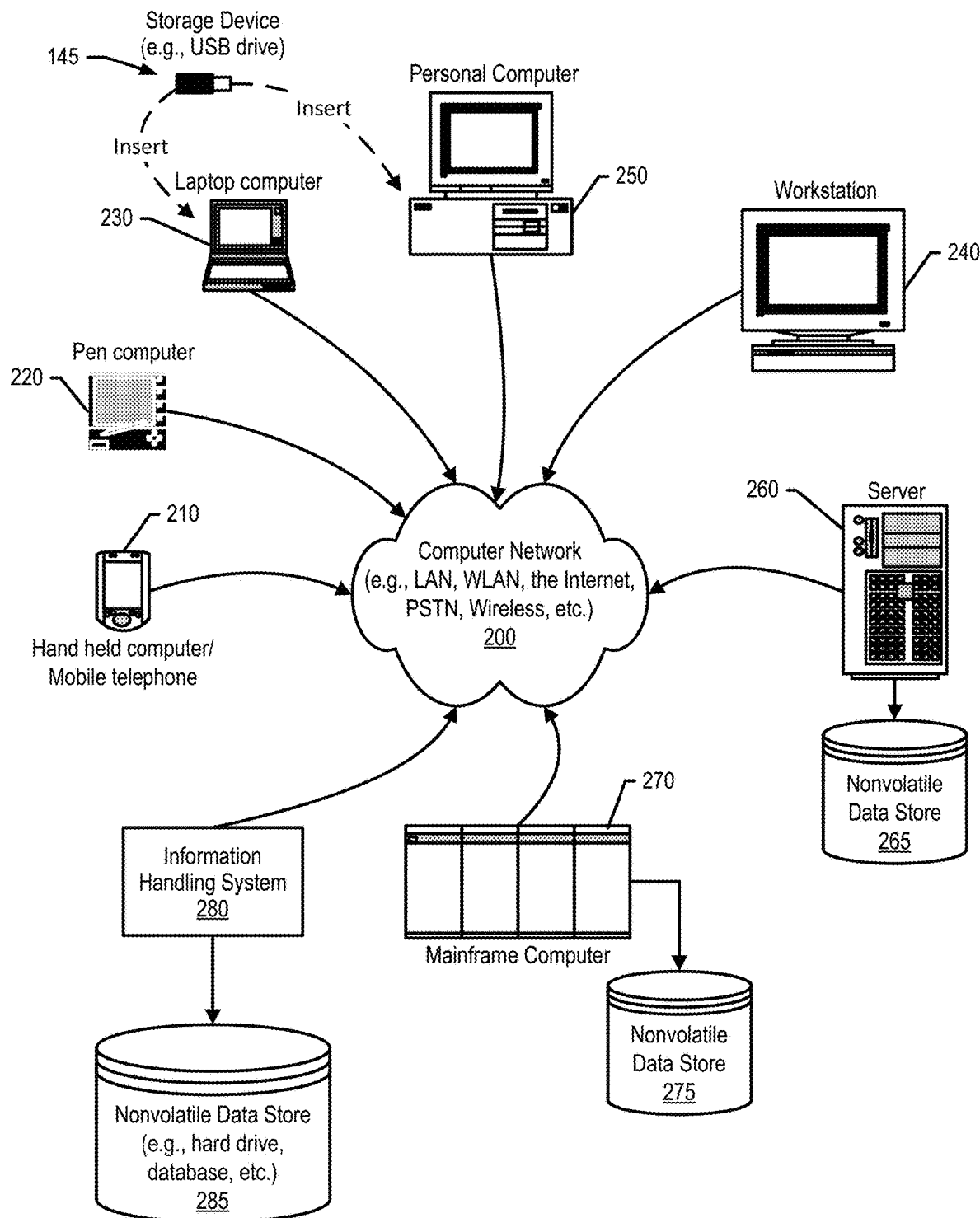
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

CQA systems typically fall into two main categories, which are i) graph-based team formation and ii) expert finding. Some prior approaches aim to form a group of experts by exploring a network graph constructed using questions, experts, and their relationships. Such methods optimize several objectives such as skill coverage and team coherency (coordination and communication cost), and expertise level. Other prior approaches treat experts individually and rank them based on their skills related to the question at hand.

Graph-based team formation approaches require a pre-defined set of skills as the input. However, such skills are dynamic, latent, and are learned from the questions and experts' answers during the team formation process. Graph-based team formation approaches also fail to capture similarities between skills. For example, a system may receive a question about programming in C++ and only two experts e1 and e2 are available. E1 has skill in C# and e2 has skill in Pascal. In this example, the system is not able to form a team because neither e1 nor e2 have skills in C++. Furthermore, graph-based team formation approaches do not give preference to either e1 or e2 as neither has the exact required skill, even though C# has higher similarity to C++ compared to Pascal and therefore e1 should be a more suitable option. This problem is often known as vocabulary mismatch.

To address the issue of vocabulary mismatch, learn to rank methods designed primarily for ad hoc retrieval are adopted to compute the similarity between the content of a new question and the content of experts' answers without the need for explicitly defining skills. In this context, answers and the questions are transformed into an embedding space where skills are learned to find the highest similarity between relevant experts and the questions. Given the transformation from term space to embedding space, the issue with vocabulary mismatch can be overcome, such as using learn to rank methods to find top-k experts with respect to the question. However, learn to rank approaches do not capture (1) the quality of the experts' past engagements (expertise level of experts), and (2) the need to identify a team of experts as opposed to just identifying a single expert. More specifically, learn to rank methods are designed primarily to rank each item (document) regardless of its interaction with other documents in the output list. Therefore, adopting learn to rank methods directly for team formation problems lead to the formation of teams that are not guaranteed to respect the required skill coverage or past team collaboration history.

Turning to current expert finding approaches, these approaches are primarily focused on retrieving a ranked list of experts that are relevant to a question. Existing expert finding approaches, however, are limited from three main perspectives. First, as questions become more complicated and multidisciplinary, existing approaches have difficulty in finding an individual expert who can solely address an information need (answer a question). Second, a retrieved ranked list of experts is not optimized for collaboration. In other words, there is no guarantee that the retrieved experts have complementary skill sets and therefore, retrieving top-ranked k experts with overlapping skills may not add much benefit over just selecting a single expert. Third, even for cases when the top k experts have complementary skill sets, they may not be the best experts to collaborate with each other with lower communication cost.

To solve the aforementioned challenges, FIGS. 3 through 8 depict an approach that can be executed on an information handling system that expands expert finding techniques into developing teams of experts who collaboratively address an information need. As such, given a new question at a CQA system, the approach constructs a team of proper experts to collaboratively answer the new question.

Figure 3:
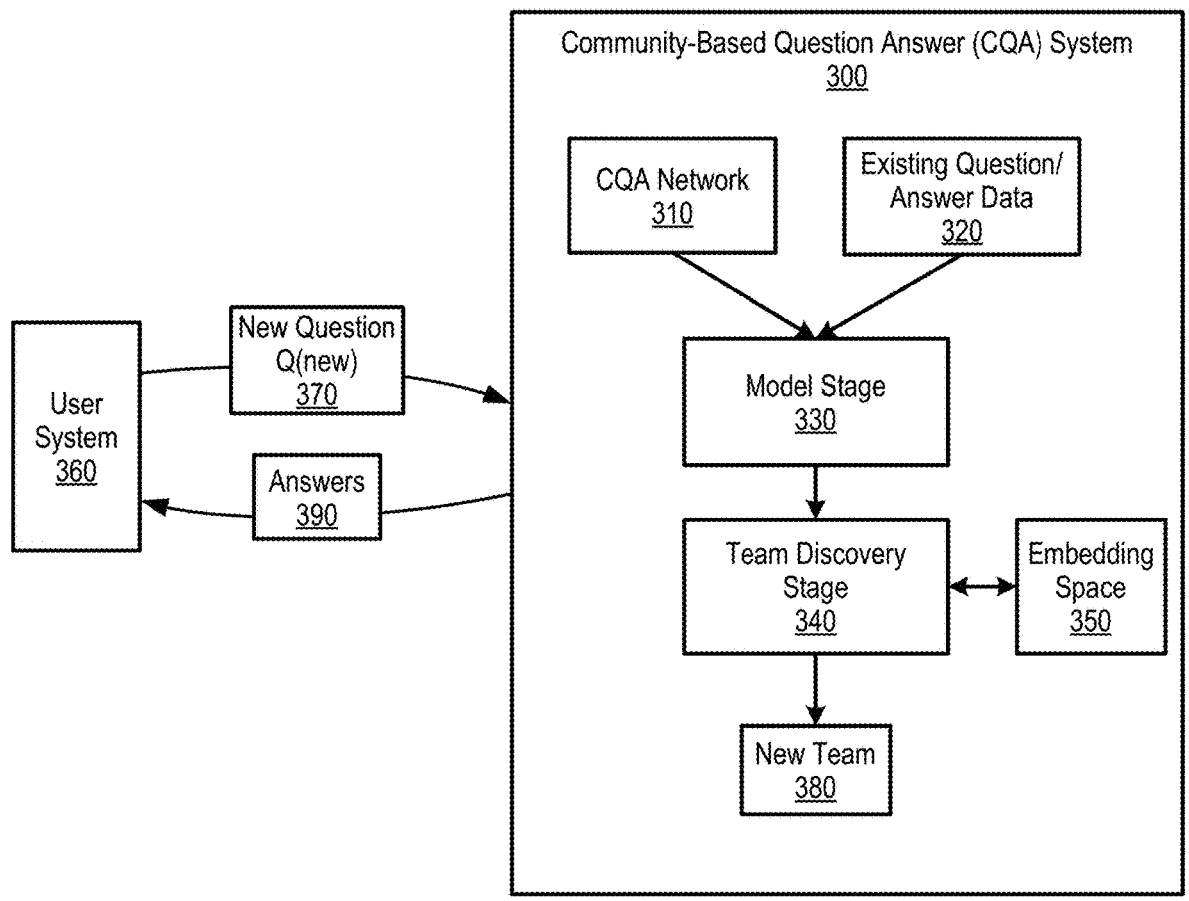
FIG. 3 is an exemplary diagram depicting a community-based question answer system that transforms prior questions and experts into embedding space and uses the embedding space to form a new team for a new question.

FIG. 3 is an exemplary diagram depicting a community-based question answer system that transforms prior questions and experts into embedding space and uses the embedding space to form a new team for a new question. Community-based question answer (CQA) system 300 uses an embedding-based approach to identify collaborative team formations by mapping and preserving the structure of existing teams and the relationships between experts and questions in embedding space. CQA system 300 not only captures historical relationships between questions and experts to form a new team, but also learns from past expert collaboration history of embedding experts and questions so as to preserve explicit team membership information when learning the embedding representations.

CQA system 300 models CQA network 310 as G(V,E,T, W), where V is a set of nodes, E is a set of edges, T is a set of node and edge types, and W is a weighting function. Set $T_V$ denotes node types that can be questions (q) or experts (e), and set $T_E$ indicates a set of edge types which can be question-expert (q-e) relationships (see FIG. 4 and corresponding text for further details).

Figure 4:
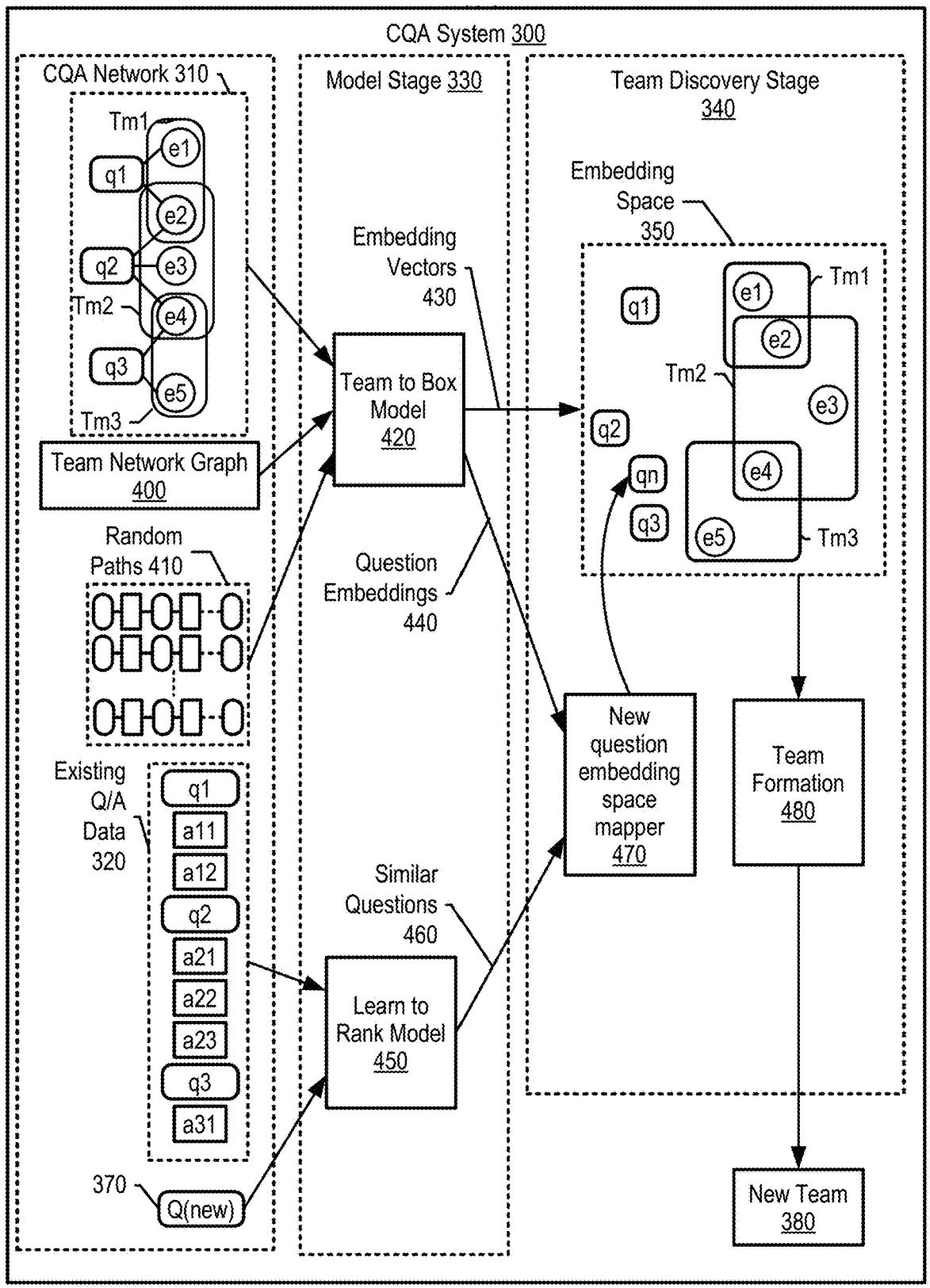
FIG. 4 is an exemplary diagram depicting a CQA system that maps existing question expert pairs to an embedding space; maps a new question to the embedding space; and forms a new team based on the relative location of the new question to existing questions in the embedding space.

CQA network 310 feeds into model stage 330, which trains a machine learning model shown in FIG. 4, referred to as team to box model 420. Model stage 330 learns the embeddings of teams, questions, and answerers where, in one embodiment, "G(embed)" are embedding vectors of teams, questions, and experts. Model stage 330 sends the learned embedding vectors to team discovery stage 340. In addition, model stage 300 uses existing question/answer data 320 to learn latent representations of words used in CQA network 310 (learn to rank model 450 shown in FIG. 4).

Team discovery stage 340 maps the existing questions and experts to embedding space 350 based on the learned embedding vectors. In one embodiment, team discovery stage 340 embeds teams as regions in embedding space 350 and experts and questions as points (vectors) in the same space (see FIG. 5 and corresponding text for further details).

Existing question/answer data 320 includes previous questions and expert answer mappings where "m" experts are denoted by set E={e_1, e_2, . . . , e_m}, and with "n past" questions denoted as Q={q_1, q_2, . . . , q_n}. Existing question/answer data 320 has A_i={a_1, a_2, . . . , a_ni} as the set of ni answers to question q_i with voting scores S_i={s_1, s_2, . . . , s_ni} where integer s_j is the difference between up-votes and down-votes of answer a_j to question q_j given by readers. Furthermore, existing question/answer data 320 has TG_i={tg_1, tg_2, . . . } as a set of tags for question q_i assigned by its asker and each tag is a keyword which defines the subject of the question (see FIGS. 4, 5, and corresponding text for further details).

User system 360 sends new question Q(new) 370 to CQA system 300 and CQA system 300 beings steps to discover an appropriate collaborative team formation (new team 380). In one embodiment, CQA system 300 uses the following criteria to discover a team of experts, denoted by set T with size of at most t:

Skill Coverage: The desired team T has a higher coverage of the background knowledge required by the new question and the content similarity between the new question and the past questions answered by the experts in the desired team is maximized.

Expertise Level: The experts in the desired team have a high reputation in answering questions in the past and a team with a higher average score of answers given by its experts to the existing questions similar to the new question is desired.

Team Coherency: Experts in the desired team have high willingness to work together as a team and a team with high past collaborations among pairs of its members is preferred.

CQA system 300 uses learn to rank model 450 shown in FIG. 4 to obtain the top k most similar question to new question 370 from existing question/answer data 320. Team discovery stage 340 then uses embedding vectors of the top k most similar questions to map new question 370 into embedding space 350 (see FIG. 4 and corresponding text for further details).

Then, CQA system 300 computes distances between the embedding vectors of the teams from CQA network 310 and the embedding vector of new question 370 to select the top n experts from the most similar teams to the question. Team discovery stage 340 then forms new team 380 from the top n experts (see FIG. 4 and corresponding text for further details).

Then, CQA system 300 sends new question 370 to the experts in new team 380 and passes their corresponding answers 390 to user system 360. In one embodiment, CQA system 300 stores new question 370 and the expert answers in CQA network 310 and existing question/answer data 320. In another embodiment, CQA system 300 builds CQA network 310 based on existing QA data 320 where CQA network 310 represents questions and their corresponding answerers (experts) as a network.

FIG. 4 is an exemplary diagram depicting a CQA system that maps existing question expert pairs to an embedding space; maps a new question to the embedding space; and forms a new team based on the relative location of the new question to existing questions in the embedding space.

As discussed herein, CQA system 300 transforms existing question expert pair information to embedding space 350, and then maps a new question 370 to embedding space 350 to identify a new team. To transform existing question expert pair to embedding space 350, CQA system 300 feeds CQA network 310, team network graph 400, and random paths 410 as inputs into team to box model 420. Team network graph 400 is an undirected weighted graph of CQA network 310 (see FIG. 5 and corresponding text for further details). In one embodiment, random paths 410 are generated using random walks on CQA network 310 and team network graph 400. In this embodiment, each random path consists of sequences of nodes of type teams or types of questions and experts. Such paths are used to generate positive and negative training samples for team to box model 420. Team to box model 420 proceeds through a series of transformations to create embedding vectors 430.

Figure 5:
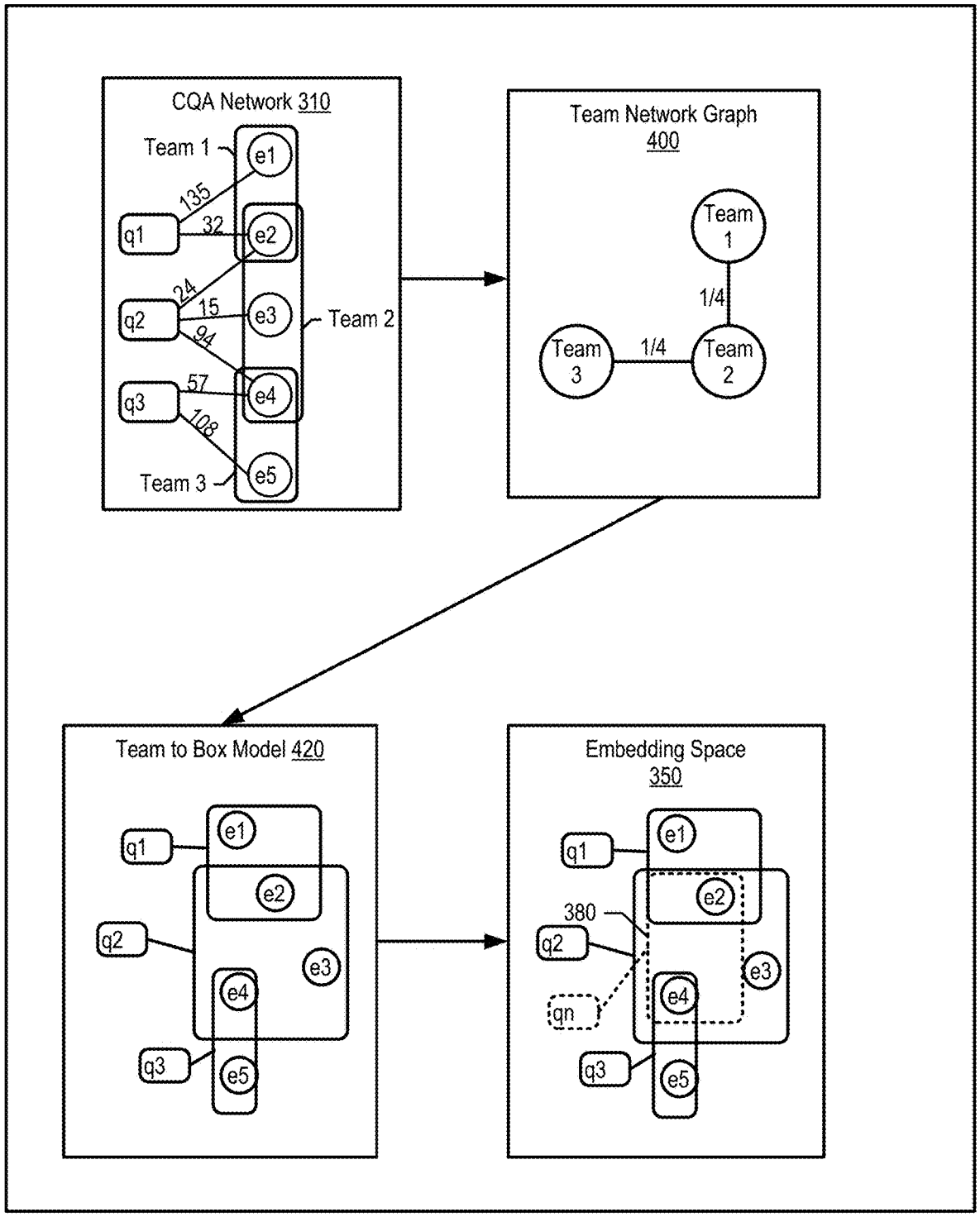
FIG. 5 is an exemplary diagram depicting a detailed approach to map CQA network 310 to embedding space 350.

Embedding vectors 430 include team center vectors and offset vectors for each team, which team discovery stage 340 uses to map the teams to embedding space 350 (see FIG. 5 and corresponding text for further details). Team discovery stage 340 embeds teams as "regions" in embedding space 350 and then embeds experts and questions as points (vectors) in the region. Preserving the team structure and their relationships has several advantages. First, the preservation makes it possible to identify past relevant teams given an input question without having to compose teams from individual experts. Second, the preservation allows for determining appropriate team structure (e.g., ideal team size) based on how an input question relates to its closest teams in the embedding space. And third, the preservation ensures that team members exhibit complementary skill sets for answering a question, as opposed to having highly overlapping skills.

CQA system 300 trains learn to rank model 450 on existing Q/A data 320 to learn latent representations of words from existing questions and their answers. Then, CQA system 370 receives new question 370 and feeds new question 370 into learn to rank model 450. Learn to rank model 450 determines, from existing Q/A data 320, the top k questions 460 that are most similar to new question 370.

New question embedding space mapper 470 retrieves question embeddings 440 that correspond to similar questions 460; computes an embedding vector of the new question based on question embeddings 440; and embeds the new question (qn) in embedding space 350 based on the computed embedding vector. Team discovery stage 340 via team formation 480 then computes distances between the embedding vectors of the existing teams in the embedding space and the embedding vector of the new question, and selects the top n experts from the most similar teams to the new question based on the computed distances (see FIG. 7 and corresponding text for further details).

Team formation 480 then defines new team 380 for new question 370 based on the selected top n experts. In turn, CQA system 300 sends new question 370 to new team 380 for answers 390, which CQA system 300 passes answers 390 back to user system 360.

FIG. 5 is an exemplary diagram depicting a detailed approach to map CQA network 310 to embedding space 350.

As discussed above, CQA system 300 models CQA network 310 as G(V,E,T,W), where V is a set of nodes, E is a set of edges, and T is a set of node and edge types, and W is a weighting function, where W: E→Ew maps each edge to a weight, and Ew is a set of possible weights. In one embodiment, Ew is a voting score equal to the difference between the up-votes and down-votes of answers for (q-e) relationships. FIG. 5 shows that the Ew of q1-e1 is 135 (answer provided by expert e1 for question q1 received 135 voting scores); the Ew of q1-e2 is 32, and etcetera.

In another embodiment, the nodes of experts connected to a node of type question are considered to form a team. Then, nodes of G along with teams (sub-graphs of G) are mapped into an embedding space. In this embodiment, each team (a sub-graph in G) is represented as a region in the embedding space and each node as a point in the corresponding regions.

CQA system 300 models teams and their relations in CQA network 310 as an undirected weighted graph, shown as team network graph 400. In team network graph 400, the nodes denote teams and edges show non-empty intersection between the teams and the weight of each edge is defined as the fraction of common experts between the two endpoint teams. FIG. 5 shows that CQA network 310 has three teams, which are team1={e1, e2}, team2={e2, e3, e4}, and team3={e4, e5}. Based on CQA network 310, team network graph 400 shows no edge between team1 and team3 because their intersection is empty in CQA network 310. In addition, the weight of 114 for the (team1, team2) edge is computed as |team1∩team2|/(|team1|+|team2|−|team1∩team2|); where |X| denotes the size of set X. In one embodiment, team network graph 400 captures the expert overlaps between teams and ignores the edge weights in CQA network 310.

Based on team network graph 400, CQA system 300 represents each team as a box using a team center vector and offset vector. CQA system 300 specifies a team i in a d-dimensional embedding space as i=(C(i),O(i)) E Red where the center C (i) and offset O(i) vectors define the team box as follows:

$$Box_i = \{v \in R^d | dist(C^{(i)}, v) \leq 0^{(i)}\}$$

where dist(C(i), v) denotes the distance between vector v and center vector C(i). CQA system 300 determines the offset vector O(i) based on the team size while CQA system 300 learns the center vector C(i), in one embodiment, using skip-gram with negative sampling over team network graph 400 (see FIG. 7 and corresponding text for further details). In turn, CQA system 300 maps the teams to embedding space 350 based on the center vectors and offset vectors.

Figure 8:
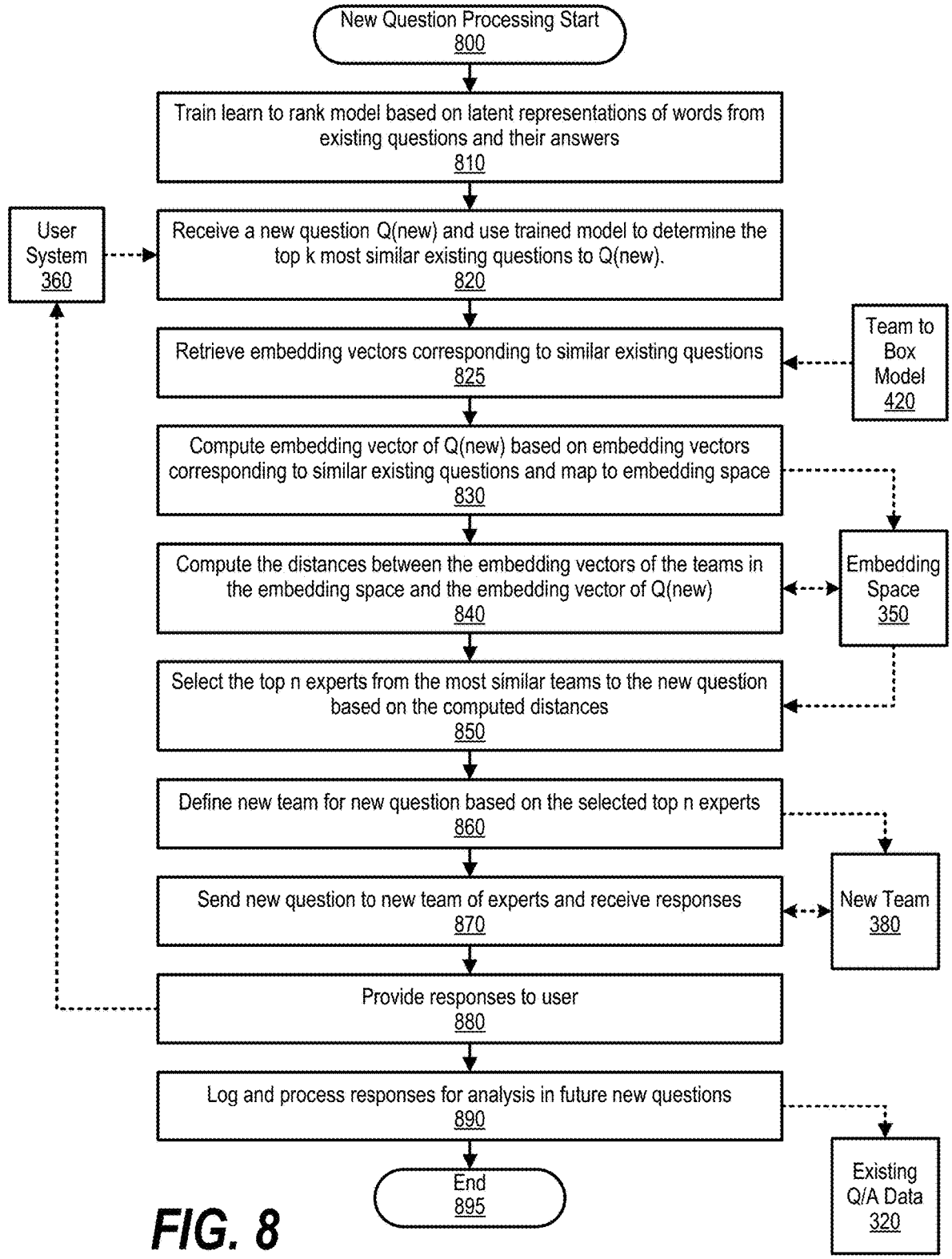
FIG. 8 is an exemplary flowchart depicting steps taken to receive a new question and form a new team of experts to best answer the new question.

Then, when CQA system 300 receives new question 370 and maps new question "qn" to embedding space 350, CQA system 300 identifies experts based on techniques discussed herein and forms a new team 380 (includes e2 and e4 in FIG. 5) to best answer the new question (see FIG. 8 and corresponding text for further details).

Figure 6:
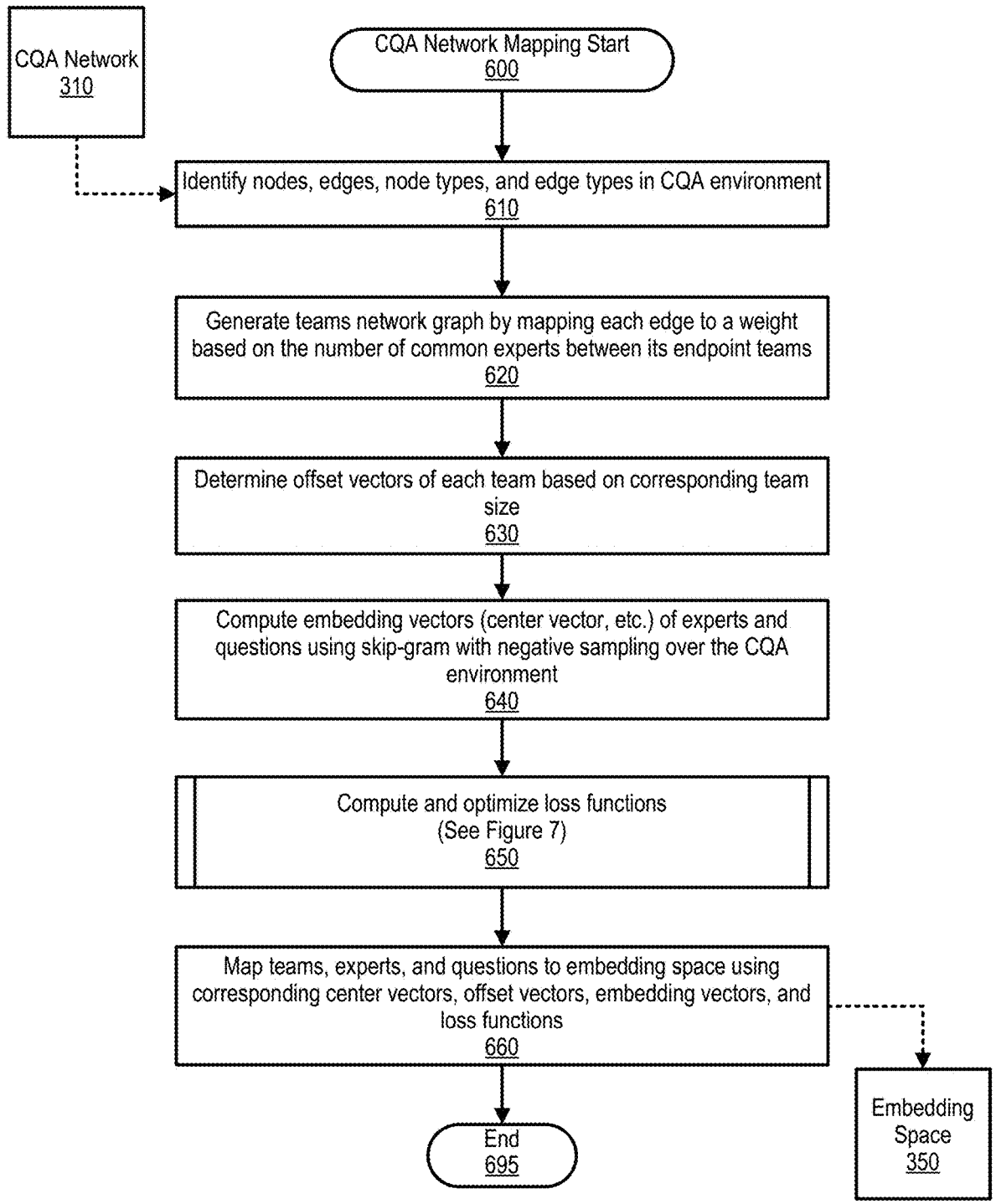
FIG. 6 is an exemplary flowchart depicting steps taken to map CQA network 310 into embedding space 350.

FIG. 6 is an exemplary flowchart depicting steps taken to map CQA network 310 into embedding space 350. FIG. 6 processing commences at 600 whereupon, at step 610, the process identifies nodes, edges, node types, and edge types in CQA network 310. In one embodiment, CQA network 310 is built using existing question/answer data 320. In this embodiment, questions and experts (answerers) are considered as nodes of the network and an edge between a node of type question and a node of type expert shows that the expert has written an answer to the question. The weight of the edge shows the answer voting score.

At step 620, the process generates team network graph 400 by mapping each edge in CQA network 310 to a weight based on the number of common experts between its endpoint teams.

At step 630, the process determines offset vectors of each team based on corresponding team size. For example, the size of team1 and team3 in FIG. 5 are the same in the embedding space because both have two members. Similarly, the size of team2 should be 1.5 times of the size of team1 and team3 because team2 has three members.

At step 640, the process computes embedding vectors of experts and questions using a skip-gram with negative sampling over the CQA environment, referred to herein as a set of expert center vectors and a set of question center vectors. In one embodiment, nodes of the network are located in a random position in the vector space in which common members between teams are placed in the overlapping region of the teams' boxes. Then, team to box model 420 learns their positions in a way that experts who have answered more common questions to be close to each other compared to the experts with no collaborations to answer common questions.

Figure 7:
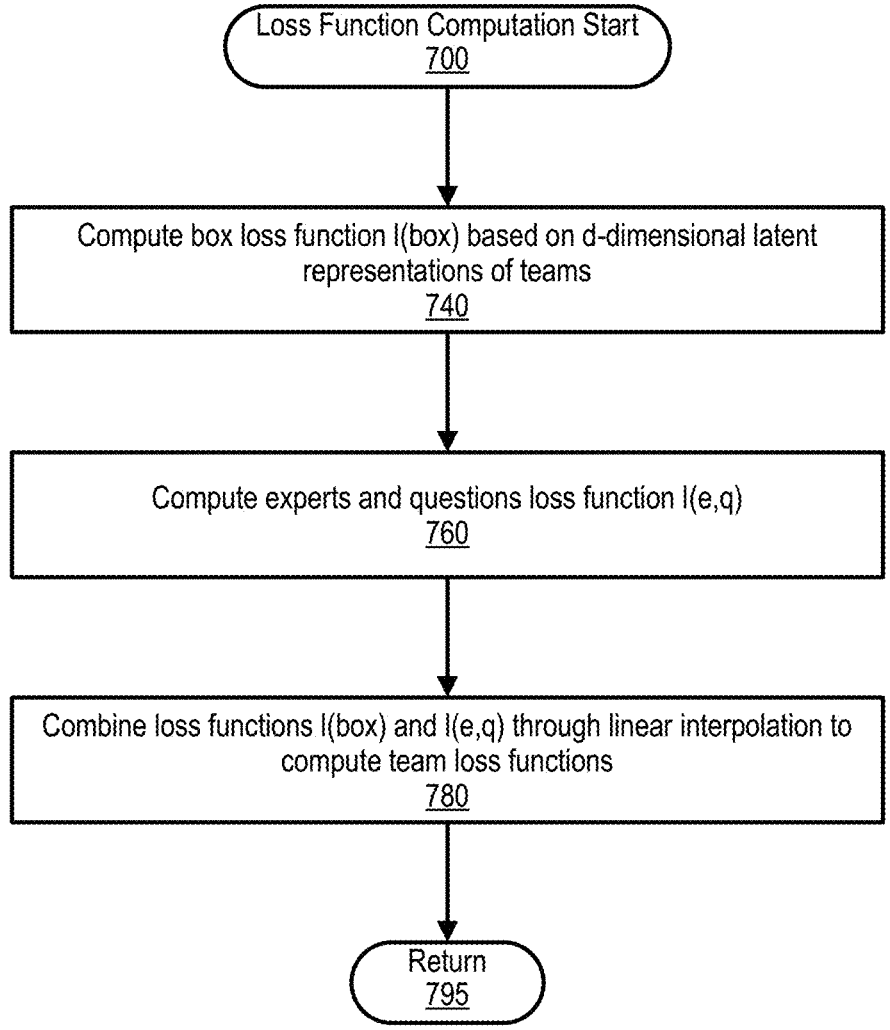
FIG. 7 is an exemplary diagram depicting steps taken to compute loss functions.

At predefined process 650, the process computes and optimizes loss functions (see FIG. 7 and corresponding text for processing details). At step 660, the process maps teams, experts, and questions to embedding space 350 using their corresponding center vectors, offset vectors, embedding vectors, and loss functions. FIG. 6 processing thereafter ends at 695.

FIG. 7 is an exemplary diagram depicting steps taken to compute loss functions. FIG. 7 processing commences at 700 whereupon, at step 740, the process computes a box loss function I(box) based on d-dimensional latent representations of teams. In one embodiment, the process specifies a team i in a d-dimensional embedding space as $i=(C(i), O(i)) \in R^{2d}$ where the center $C(i)$ and offset $O(i)$ vectors define the team box as follows:

$$Box_i = \{v \in R^d | dist(C^{(i)}, v) \leq O^{(i)}\}$$

where dist(C(i), v) denotes the distance between vector v and center vector C(i). CQA system 300 determines the offset vector O(i) based on the team size while the center vector C(i) is learned using skip-gram with negative sampling over team network graph 400. Given team i and j as positive training samples, and k=1, 2, . . . , K as K negative samples, CQA system 300 minimizes the loss as:

$$l_{box} = (dist(C^{(i)}, C^{(j)}) - d_{ij})^2 + \frac{1}{K}\sum_{k=1}^{K} E_{C^{(k)} \sim P(C)}[\max(0, d_{ik} - dist(C^{(i)}, C^{(k)}))]^2$$

where dist(C(i),C(j)) is the distance between two centers and dij is a constant to control the overlap between the teams. For any two nodes in team network graph 400, dij=(1−wij)(O(i)+O(j)) where wij is the weight of the edge for adjacent nodes and zero otherwise. In one embodiment, an Euclidean distance is used as function dist( ). The first term in the loss function tends to embed adjacent teams with common members as overlapping boxes in the embedding space. The second term penalizes when disjoint teams are embedded as overlapping boxes. In this embodiment, the percentage of overlapping section between the boxes of teams i and j is controlled by dij computed based on the percentage of their common experts (e.g., wij).

Given graph G, the d-dimensional latent representations are learned as $X \in R^{N \times d}$ for all nodes of type question and expert such that it preserves their semantic and structural relationships. Note that here N=n+m and d<<N. To do so, parameters θ are learned to optimize:

$$\text{argmax}_\theta \sum_{v \in V} \sum_{t \in T'_v} \sum_{v_t \in N_t(v)} \log P(v_t|v; \theta).$$

where $T'_v = \{experts, questions\}$ and $N_t(v)$ is the set of neighbor nodes of type t of node v. Probability $P(v_t|v; \theta)$ is a softmax function defined as:

$$P(v_t|v; \theta) = \frac{\exp(x_{v_t} \cdot x_v)}{\sum_{u \in V \varphi(u) \in T'_v} \exp(x_u \cdot x_v)}$$

where $\varphi(u): V \rightarrow T_v$ mapping node type for each node u, and $x_v$ is the embedding vector for node v.

At step 760, the process computes experts and questions loss function I(e,q).

In one embodiment, computing softmax is demanding for large networks. As such, by using skip-gram with negative sampling, log $P(v_t|v; \theta)$ is computed through K negative samples as:

$$l_{e,q} = \log \sigma(x_v \cdot x_{v_t}) + \sum_{k=1}^{K} E_{u^k \sim P(u)}[\log \sigma(-x_v \cdot x_{u^k})]$$

where σ is a Sigmoid function, and P(u) is a negative sampling distribution. At step 780, the process combines loss functions I(box) and I(e,q) through linear interpolation to compute team loss function: $I_{team2box} = I_{box} + I_{e,q}$. Once the embedding of teams, experts, and questions are learned, CQA system 300 is able to receive new questions and form new teams (see FIG. 8 and corresponding text for further details). FIG. 7 processing thereafter returns to the calling routine (see FIG. 6) at 795.

FIG. 8 is an exemplary flowchart depicting steps taken to receive a new question and form a new team of experts to best answer the new question. FIG. 8 processing commences at 800 whereupon, at step 810, the process trains learn to rank model 450 based on latent representations of words from existing questions and their answers. At step 820, the process receives a new question 370 and uses the trained learn to rank model 450 to determine the top k existing questions from existing Q/A data 340 that are most similar to new question 370.

At step 825, the process retrieves question embeddings 440 corresponding to the determined top k existing questions. At step 830, the process computes an embedding vector of new question 370 based on the embedding vectors corresponding to similar existing questions and maps the new question to embedding space 350 based on the computed embedding vector. Referring to FIG. 4, new question embedding space mapper 470 maps qn to embedding space 350.

At step 840, the process computes distances between the embedding vectors of the teams in the embedding space and the embedding vector of new question 370. In one embodiment, distances to the teams are first computed and top closest teams are selected. Then, n experts are chosen from the selected top teams. At step 850, the process selects the top n experts from the most similar teams to the new question based on the computed distances. Referring to FIG. 5, CQA system 300 selects e2 and e4 to form new team 380 for qn.

At step 860 the process (team formation 480) defines new team 380 for new question 370 based on the selected top n experts. At step 870, the process sends new question 370 to new team 380 and receives responses. At step 880, the process provides the responses to user system 360 via answers 390. At step 890, the process logs and processes the new question and corresponding, answers for analysis in future new questions. FIG. 8 processing thereafter ends at 895.

While particular embodiments of the present disclosure have been shown and described, it will be obvious to those skilled in the art that; based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases at least one and one or more to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
defining a set of teams in a Community-Based Question/Answer (CQA) network based on at least one question from a set of questions and at least one expert from a set of experts;
determining a set of offset vectors of each of the set of teams based on an amount of the set of experts in their corresponding team;
computing a set of embedding vectors comprising a set of team center vectors, a set of expert embedding vectors, and a set of question embedding vectors based on the set of teams, the set of experts, and the set of questions;
computing a set of loss functions based on the set of offset vectors, the set of team center vectors, the set of expert embedding vectors, and the set of question embedding vectors;
mapping a set of question nodes and a set of expert nodes to an embedding space based on the set of embedding vectors and the set of loss functions, wherein the set of question nodes corresponds to the set of questions and the set of expert nodes corresponds to the set of experts in the CQA network;
mapping a new question to the embedding space based on analyzing the new question against the set of questions;
selecting a subset of the set of expert nodes based on their location in the embedding space relative to the mapping of the new question; and
transmitting the new question to a subset of the set of experts that correspond to the subset of expert nodes.

2. The computer-implemented method of claim 1 further comprising:
learning a set of latent word representations from the set of questions and a set of answers corresponding to the set of questions; and
mapping the new question to the embedding space based on analyzing the new question against the set of latent word representations.

3. The computer-implemented method of claim 2 further comprising:
building the CQA network based on the set of questions and the set of answers, wherein the CQA network comprises the set of question nodes, the set of expert nodes, and at least one edge value between a first one of the question nodes and a first one of the expert nodes that indicate an amount of voting scores corresponding to an answer to the first question provided by the first expert.

4. The method of claim 3 further comprising:
generating a team network graph from the CQA network based on the set of teams, wherein the team network graph identifies one or more expert overlaps between the set of teams.

5. The computer-implemented method of claim 4 further comprising:
grouping the subset of experts into a new team;
receiving a set of new answers corresponding to the new question from the subset of the experts; and
dynamically updating the CQA network based on the new question, the set of new answers, and the new team.

6. The computer-implemented method of claim 1 wherein the CQA network is expressed as $G(V,E,T,W)$, and wherein:
V comprises the set of question nodes and the set of expert nodes;
E comprises a set of edges between the set of question nodes and the set of expert nodes;
T is a set of node and edge types wherein set $T_V$ indicates a set of node types and $T_E$ indicates a set of edge types; and
W comprises a set of weightings to the set of edges determined by a set of voting scores computed as a difference between up-votes and down-votes of answers for a question node/expert node combination.

7. An information handling system comprising:
one or more processors;
a memory coupled to at least one of the processors;
a set of computer program instructions stored in the memory and executed by at least one of the processors in order to perform actions of:
defining a set of teams in a Community-Based Question/Answer (CQA) network based on at least one question from a set of questions and at least one expert from a set of experts;
determining a set of offset vectors of each of the set of teams based on an amount of the set of experts in their corresponding team;
computing a set of embedding vectors comprising a set of team center vectors, a set of expert embedding vectors, and a set of question embedding vectors based on the set of teams, the set of experts, and the set of questions;

computing a set of loss functions based on the set of offset vectors, the set of team center vectors, the set of expert embedding vectors, and the set of question embedding vectors;

mapping a set of question nodes and a set of expert nodes to an embedding space based on the set of embedding vectors and the set of loss functions, wherein the set of question nodes corresponds to the set of questions and the set of expert nodes corresponds to the set of experts in the CQA network;

mapping a new question to the embedding space based on analyzing the new question against the set of questions;

selecting a subset of the set of expert nodes based on their location in the embedding space relative to the mapping of the new question; and transmitting the new question to a subset of the set of experts that correspond to the subset of expert nodes.

8. The information handling system of claim 7 wherein the processors perform additional actions comprising:

learning a set of latent word representations from the set of questions and a set of answers corresponding to the set of questions; and mapping the new question to the embedding space based on analyzing the new question against the set of latent word representations.

9. The information handling system of claim 8 wherein the processors perform additional actions comprising:

building the CQA network based on the set of questions and the set of answers, wherein the CQA network comprises the set of question nodes, the set of expert nodes, and at least one edge value between a first one of the question nodes and a first one of the expert nodes that indicate an amount of voting scores corresponding to an answer to the first question provided by the first expert.

10. The information handling system of claim 9 wherein the processors perform additional actions comprising:

generating a team network graph from the CQA network based on the set of teams, wherein the team network graph identifies one or more expert overlaps between the set of teams.

11. The information handling system of claim 10 wherein the processors perform additional actions comprising:

grouping the subset of experts into a new team;

receiving a set of new answers corresponding to the new question from the subset of the experts; and dynamically updating the CQA network based on the new question, the set of new answers, and the new team.

12. The information handling system of claim 7 wherein the CQA network is expressed as G(V,E,T,W), and wherein:

V comprises the set of question nodes and the set of expert nodes;

E comprises a set of edges between the set of question nodes and the set of expert nodes;

T is a set of node and edge types wherein set $T_V$ indicates a set of node types and $T_E$ indicates a set of edge types; and W comprises a set of weightings to the set of edges determined by a set of voting scores computed as a difference between up-votes and down-votes of answers for a question node/expert node combination.

13. A computer program product stored in a computer readable storage medium, comprising computer program code that, when executed by an information handling system, causes the information handling system to perform actions comprising:

defining a set of teams in a Community-Based Question/Answer (CQA) network based on at least one question from a set of questions and at least one expert from a set of experts;

determining a set of offset vectors of each of the set of teams based on an amount of the set of experts in their corresponding team;

computing a set of embedding vectors comprising a set of team center vectors, a set of expert embedding vectors, and a set of question embedding vectors based on the set of teams, the set of experts, and the set of questions;

computing a set of loss functions based on the set of offset vectors, the set of team center vectors, the set of expert embedding vectors, and the set of question embedding vectors;

mapping a set of question nodes and a set of expert nodes to an embedding space based on the set of embedding vectors and the set of loss functions, wherein the set of question nodes corresponds to the set of questions and the set of expert nodes corresponds to the set of experts in the CQA network;

mapping a new question to the embedding space based on analyzing the new question against the set of questions;

selecting a subset of the set of expert nodes based on their location in the embedding space relative to the mapping of the new question; and transmitting the new question to a subset of the set of experts that correspond to the subset of expert nodes.

14. The computer program product of claim 13 wherein the information handling system performs further actions comprising:

learning a set of latent word representations from the set of questions and a set of answers corresponding to the set of questions; and mapping the new question to the embedding space based on analyzing the new question against the set of latent word representations.

15. The computer program product of claim 14 wherein the information handling system performs further actions comprising:

building the CQA network based on the set of questions and the set of answers, wherein the CQA network comprises the set of question nodes, the set of expert nodes, and at least one edge value between a first one of the question nodes and a first one of the expert nodes that indicate an amount of voting scores corresponding to an answer to the first question provided by the first expert.

16. The computer program product of claim 15 wherein the information handling system performs further actions comprising:

generating a team network graph from the CQA network based on the set of teams, wherein the team network graph identifies one or more expert overlaps between the set of teams.

17. The computer program product of claim 16 wherein the information handling system performs further actions comprising:

grouping the subset of experts into a new team;

receiving a set of new answers corresponding to the new question from the subset of the experts; and dynamically updating the CQA network based on the new question, the set of new answers, and the new team.

* * * * *